(12) United States Patent
Halik et al.

(10) Patent No.: US 6,750,317 B2
(45) Date of Patent: Jun. 15, 2004

(54) MATERIAL AND ADDITIVE FOR HIGHLY CROSSLINKED CHEMICALLY AND THERMALLY STABLE POLYHYDROXYAMIDE POLYMERS

(75) Inventors: Marcus Halik, Erlangen (DE); Holger Hösch, Rehau (DE); Sezi Recai, Röttenbach (DE); Andreas Walter, Egloffstein (DE)

(73) Assignee: Infineon Technologies AG, Munich (DE)

( * ) Notice: Subject to any disclaimer, the term of this patent is extended or adjusted under 35 U.S.C. 154(b) by 7 days.

(21) Appl. No.: 10/159,861

(22) Filed: May 31, 2002

(65) Prior Publication Data

US 2003/0050431 A1 Mar. 13, 2003

(30) Foreign Application Priority Data

May 31, 2001 (DE) .......................... 101 26 572

(51) Int. Cl.$^7$ .................. C08G 69/26; C08G 69/28; C08G 63/00; C08G 69/08
(52) U.S. Cl. .................. 528/310; 528/125; 528/126; 528/171; 528/172; 528/173; 528/174; 528/179; 528/182; 528/183; 528/188; 528/332; 528/335; 528/336; 528/338; 528/327; 528/339; 525/420
(58) Field of Search ................. 528/332, 125, 528/126, 128, 171, 172, 173, 179, 182, 183, 188, 335, 336, 338, 327, 339; 525/426, 434, 420

(56) References Cited

U.S. PATENT DOCUMENTS

| | | | | |
|---|---|---|---|---|
| 3,644,286 A | * | 2/1972 | Odier et al. | 528/84 |
| 3,644,288 A | * | 2/1972 | Odier et al. | 528/185 |
| 4,833,230 A | * | 5/1989 | Kiely et al. | 528/230 |
| 4,845,183 A | * | 7/1989 | Mueller et al. | 528/185 |
| 5,077,378 A | * | 12/1991 | Mueller et al. | 528/185 |
| 5,329,044 A | * | 7/1994 | Kiely et al. | 562/564 |
| 5,376,499 A | * | 12/1994 | Hammerschmidt et al. | 430/192 |
| 5,434,233 A | * | 7/1995 | Kiely et al. | 527/310 |

FOREIGN PATENT DOCUMENTS

| | | |
|---|---|---|
| DE | 1 770 564 | 11/1971 |
| DE | 37 17 212 A1 | 12/1988 |
| EP | 0 317 942 A3 | 5/1989 |
| EP | 0 317 942 A2 | 5/1989 |
| EP | 0 512 339 B1 | 11/1992 |
| FR | 1.548.307 | 2/1972 |
| GB | 1392935 | * 5/1975 |

* cited by examiner

Primary Examiner—P. Hampton Hightower
(74) Attorney, Agent, or Firm—Laurence A. Greenberg; Werner E. Stemer; Ralph E. Locher

(57) ABSTRACT

Polyhydroxyamides are polymerized to form highly-crosslinked, temperature-stable polymers. The polyhydroxyamides include as their central, parent structure a benzenetricarboxylic acid to which side chains containing a terminal reactive group are attached by an amide bond. By way of this reactive group, highly crosslinked polymers can be formed. In addition, the polyhydroxyamide can be added as an additive to polymers in order to bring about three-dimensional crosslinking.

13 Claims, No Drawings

MATERIAL AND ADDITIVE FOR HIGHLY CROSSLINKED CHEMICALLY AND THERMALLY STABLE POLYHYDROXYAMIDE POLYMERS

BACKGROUND OF THE INVENTION

Field of the Invention

The invention relates to polyhydroxyamides that can be used for preparing highly crosslinked polymers and to temperature stable polymers prepared from these polyhydroxyamides. The invention further relates to polymers that have been three-dimensionally crosslinked using the polyhydroxyamides.

In microelectronics, in the automobile industry, in mechanical engineering, and in the aerospace industry, chemically-inert, high-heat-resistance polymers are needed as protective and insulating coats. In microelectronics, such polymers are used, for example, as a dielectric between the chip and a metallization level or between two metal levels in a chip: for example, in multichip modules or in memory chips and logic chips. Furthermore, such polymers are also used as a buffer coat between chip and housing. In the automobile industry, in mechanical engineering, and in the aerospace industry, such chemically-inert, high-heat-resistance polymers are needed for producing weather-resistant protective coats.

Polybenzoxazoles exhibit a high level of temperature stability and great chemical resistance. They are generally prepared from polyhydroxyamides that are readily soluble in organic solvents, such as N-methyl-pyrrolidone. The solutions can be applied to surfaces by spin coating, by dipping or by brush methods. The solvent can be removed subsequently by heating, which can be accompanied or followed by cyclization of the polyhydroxyamide to the polybenzoxazole, with elimination of water, in accordance with the reaction depicted below, so giving a polymer having the properties described above.

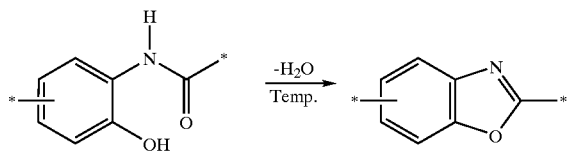

Polyhydroxyamides that are readily soluble in organic solvents and exhibit good temperature stability are described, for example, in European Patent Application No. EP 0 317 942 (which corresponds to U.S. Pat. No. 4,845,183), European Patent No. EP 0 512 339 B1 (which corresponds to U.S. Pat. No. 5,376,499), German published, non-prosecuted Application No. DE 37 17 212 A1, or U.S. Pat. No. 5,077,378 issued to Mueller et al. These materials, however, exhibit only moderate adhesion to substrates such as, for example, silicon oxide, silicon nitride, titanium nitride, tantalum nitride, glass or metals.

U.S. Pat. No. 3,644,288 issued to Odier et al. describes three-dimensionally crosslinked polybenzoxazoles obtained by cyclization from the corresponding crosslinked hydroxypolyamides by heating to a temperature in the range 220–400° C. The hydroxypolyamides are obtained by reacting an aromatic dihydroxydiamine compound, a dicarboxylic acid compound, and a tricarboxylic acid compound with one another. In one variant, the hydroxypolyamides are prepared by preparing in a first stage a linear polyamide of low molecular weight, starting from a dihydroxydiamine and a dicarboxylic acid compound, and in a second stage crosslinking this linear polyamide by adding a triester of a tricarboxylic acid. The hydroxypolyamides obtained in this way have a structure that is three-dimensionally crosslinked to a high degree and are therefore insoluble solids. For further processing, these solids are pulverized. Accordingly, it is very difficult if not impossible to process these hydroxypolyamides to thin coats, because they cannot be applied to a surface by spin coating in the form of a solution in an appropriate solvent, These hydroxypolyamides are therefore unsuited to application in microelectronics.

U.S. Pat. No. 3,644,286 issued to Odier et al. describes crosslinked polyamides and processes for preparing them. Appropriate dihydroxydiamines are reacted with dicarboxylic acid derivatives and tricarboxylic acid derivatives to give infusible solids that cannot be dissolved in organic solvents and sulphuric acid. Since these polyhydroxyamides cannot be applied in the form of a thin coat to a substrate, these compounds are likewise unsuited to application in microelectronics.

SUMMARY OF THE INVENTION

It is accordingly an object of the invention to provide a material and additive for highly crosslinked chemically and thermally stable polyhydroxyamide polymers that overcome the hereinafore-mentioned disadvantages of the heretofore-known devices of this general type and that are readily soluble in organic solvents and, from which, it is possible to prepare polybenzoxazoles that have good insulating properties, high thermal and chemical stability, and good adhesion to all customary substrates.

This object is achieved by a polyhydroxyamide of the Formula I

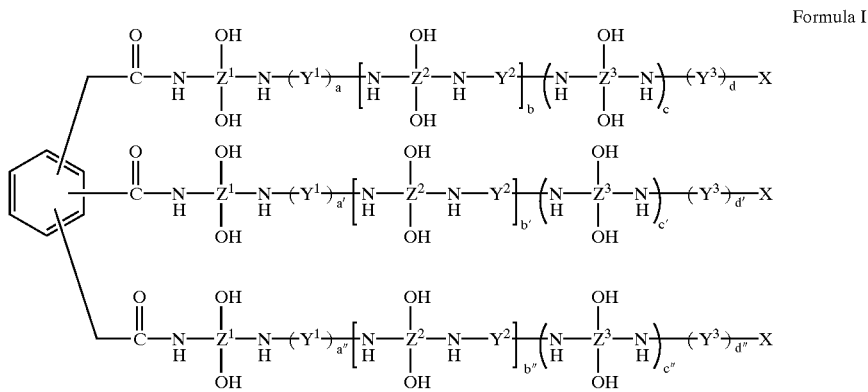

Formula I where
- a, a', a" to d, d', d" may each be identical or different and
- a=0 or 1;
- b=0 to 100;
- c=0 or 1; and
- d=0 or 1;

where
- if a=0, b=c=0;
- if c=0, d=0;
- if d=1, e=1; and
- if a =1 and b=c=0, d=0; and where
- $Z^1$, $Z^2$, and $Z^3$, which may each be identical or different, denote a tetravalent radical having up to 100 carbon atoms;
- $Y^1$, $Y^2$, and $Y^3$, which may each be identical or different, denote a divalent radical containing at least two carbonyl groups which form an amide bond to the adjacent nitrogen, and comprising up to 100 carbon atoms; and
- X, independently at each occurrence, denotes hydrogen or a monovalent radical having up to 30 carbon atoms which comprises at least one reactive group which is able to form a bond to another reaction center.

The polyhydroxyamides of the invention are readily soluble in many organic solvents, such as cyclohexanone, diethylene glycol monoethyl or diethyl ether, N-methylpyrrolidone, γ-butryolactone or ethyl lactate. They can be processed readily, for example, by spin coating or by brush methods. After drying and baking on the substrate, during which the polyhydroxyamide is cyclized to the polyoxazole, the resulting film exhibits a substantially higher thermal stability than other comparable materials and a markedly better adhesion to a variety of substrates.

The polyhydroxyamides of the invention include as their central unit a radical derived from the benzenetricarboxylic acid. Going out from this central unit in a star formation are three linear side chains. In this form, the polyhydroxyamide of the Formula I does not yet exhibit a highly crosslinked form. However, because the side chains carry terminal groups X that can react with further compounds, the polyhydroxyamides of the Formula I are able to react with further polymers and crosslink them. Therefore, by adding polyhydroxyamides of the Formula I, highly-three-dimensionally crosslinked structures that possess high mechanical stability can be formed. By adding reactive groups X, containing for example a polymerizable double bond, the polyhydroxyamides of the Formula I may also be crosslinked further themselves. Accordingly, the polyhydroxyamides of the Formula I, accordingly can also be used themselves as a starting product for conversion into corresponding polybenzoxazoles. As a result of the branching of the polymers at the central unit derived from a benzenetricarboxylic acid, and/or, where appropriate, by further crosslinking, the polymer acquires a desirable high mechanical stability. The polyhydroxyamides of the Formula I may also, however, be used as crosslinking agents for other, preferably linear, polymers. Through the fraction of the added polyhydroxyamides of the Formula I, it is possible in this case to control the degree of crosslinking and consequently, for example, the solubility of the crosslinked polymer in an organic solvent as well. The central radical is preferably of symmetrical construction; in other words, it is derived from 1,3,5-benzenetricarboxylic acid. However, other substitution patterns of the central benzene nucleus may be realized. Attached to each of the three carbonyl groups of the central benzene radical, via an amide bond, is a side chain. The three side chains may be identical or different and may have different chain lengths. The conditions stated for the indices a to d therefore apply analogously to the indices a' to d' and, respectively, a" to d" as well. Depending on the chosen conditions for the preparation of the polyhydroxyamides of the invention, it is also possible to obtain mixtures of polymers with different side chain lengths. Especially with increasing side chain lengths, these polymers, viewed macroscopically, exhibit a distribution in the length of the side chains. In that case, although the indices a to d, a' to d', and a" to d" still correspond to whole numbers for one individual molecule, viewed macroscopically the average is determined over all of the side chains. This relates in particular to the indices b, b', and b". The side chains each include groups $Z^1$ to $Z^3$, $Y^1$ to $Y^3$, and X. The groups $Z^1$ to $Z^3$, $Y^1$ to $Y^3$, and X may each be identical or different in the three side chains. Preferably, the three side chains each contain identical radicals $Z^1$ to $Z^3$, $Y^1$ to $Y^3$, and X, respectively. Further, these groups $Z^1$ to $Z^3$, $Y^1$ to $Y^3$, and X may exhibit a high degree of variability in their structure, in which case the properties of the polyhydroxyamide and, respectively, of the crosslinked polymer obtained from it can be modified further through the structure of these groups.

The groups $Z^1$ to $Z^3$ each form a tetravalent radical that may include up to 100 carbon atoms. The 4 bonds are each formed to a hydroxyl group or to the nitrogen of an amide bond. The hydroxyl groups and the nitrogens are each attached to a 5- or 6-membered aromatic or heteroaromatic radical, with one hydroxyl group and one nitrogen being arranged in each case vicinally on the aromatic or heteroaromatic radical. As a result, two pairs of substituents are formed on each of the groups $Z^1$ to $Z^3$, each pair being formed by a hydroxyl group and by an amide nitrogen disposed vicinally to it. The two pairs of substituents may be disposed on the same radical or else on different radicals within the respective groups $Z^1$ to $Z^3$. By cyclization with the carbonyl carbon of the amide bond, an oxazole structure may be formed from each of the pairs of substituents. As the aromatic radical to which in each case at least one substituent pair, including hydroxyl group and amide nitrogen, is attached within the groups $Z^1$ to $Z^3$, a phenyl ring is preferred. As the heteroaromatic radicals to which in each case at least one substituent pair, including hydroxyl group and amide nitrogen, is attached within the groups $Z^1$ to $Z^3$, both 5-membered and 6-membered rings are preferred, it is possible for these rings to include one or more heteroatoms. Preferred heteroatoms are oxygen, sulfur, and nitrogen atoms. The aromatic or heteroaromatic radicals may in each case carry further substituents, examples being alkyl groups, aryl groups, fused-on aromatic or heteroaromatic groups or else halogens or pseudohalogens. Where, within the groups $Z^1$ to $Z^3$, the substituent pairs formed from a hydroxyl group and an amide nitrogen are attached to different aromatic or heteroaromatic radicals, these radicals may be connected by fused-on phenyl radicals, by fused-on heteroaromatic 5- or 6-membered radicals or by cycloalkyl radicals, especially cyclohexyl and cyclopentyl radicals. Alternatively, the radicals that carry the substituent pairs may be connected by way of alkylene groups, preferably a methylene group. It is possible for these alkylene groups as well, which preferably comprise from 1 to 10 carbon atoms, to carry further substituents, examples being alkyl groups or halogen atoms, and to contain heteroatoms, such as nitrogen, sulfur or silicon, in the alkyl chain or pendantly. Interlinking by way of a single bond or a heteroatom, an ether group or a thioether group, for example, is also possible. The alkylene chain may further include double bonds and triple bonds as well.

Preferably, $Z^1$ to $Z^3$ are selected from the group including the following:

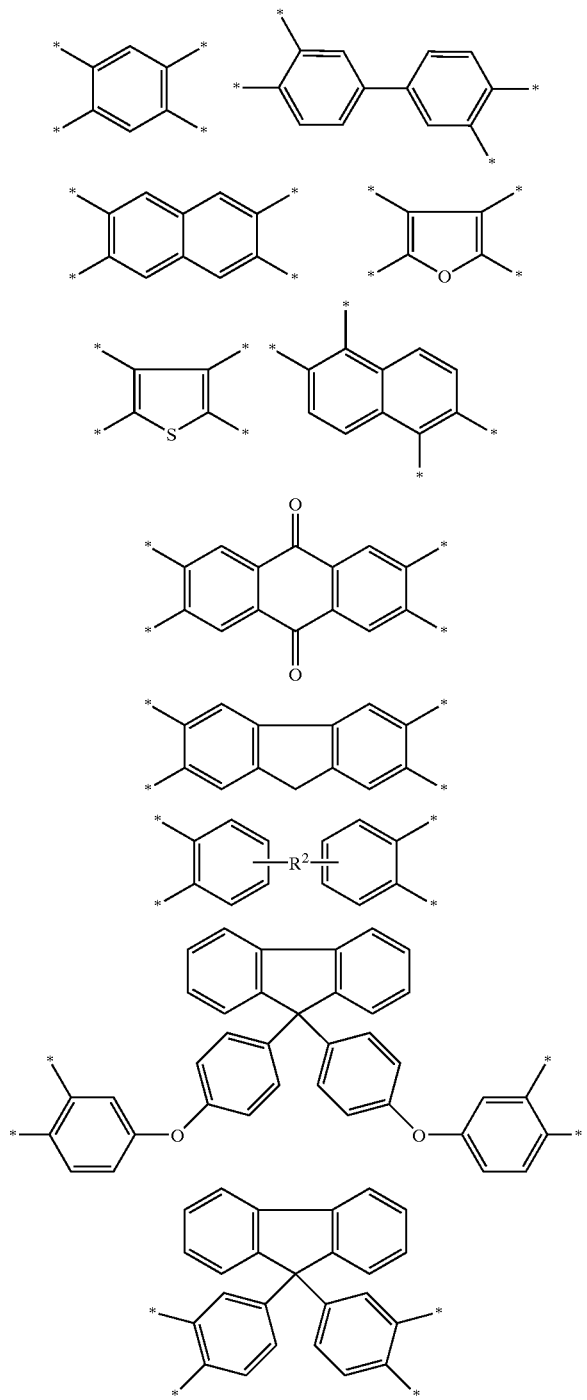

where $R^2$ stands for a divalent radical selected from the group including the following:

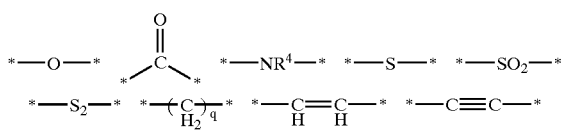

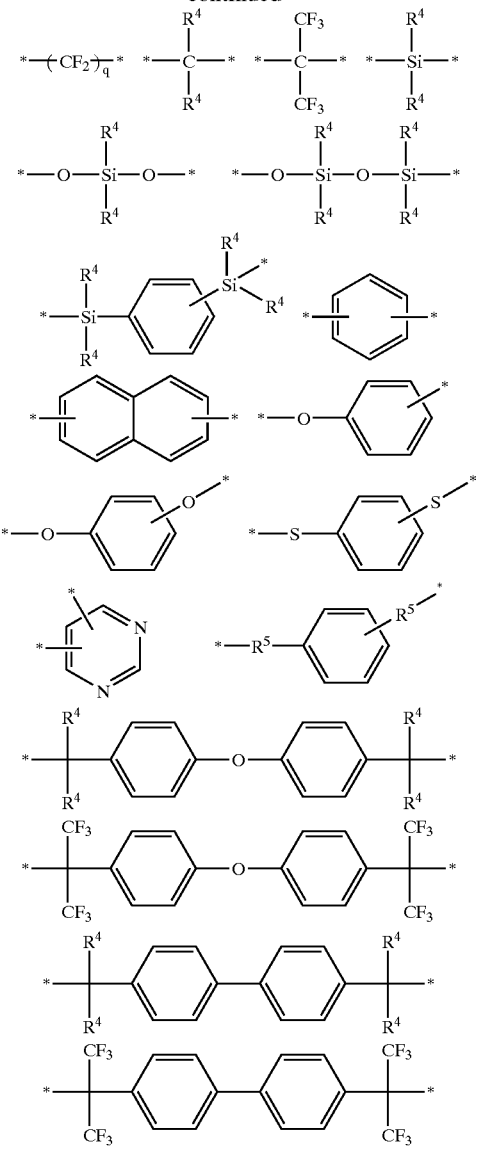

where g denotes an integer between 1 and 10;

$R^4$ denotes an alkyl group having 1 to 10 carbons, an aryl group having 6 to 20 carbons or an aralkyl group having 7 to 30 carbons, and $R^5$ denotes an alkylene group having 1 to 10 carbons, an arylene group having 6 to 20 carbons or an aralkylene group having 7 to 30 carbons.

The groups $Y^1$ to $Y^3$, as a repeating unit, produce the connection between two adjacent units each formed by the groups $Z^1$ to $Z^3$. The $Y^1$ to $Y^3$ group may also exhibit a very great structural diversity. The groups $Y^1$ to $Y^3$ each contain at least two carbonyl groups, which in each case together with the nitrogen attached to the adjacent $Z^1$ to $Z^3$ group form an amide bond. The carbonyl group is preferably attached to a phenyl ring, the two carbonyl groups being able to be attached to the same phenyl radical or to different phenyl radicals. Where the carbonyl groups are attached to different phenyl rings of the respective groups $Y^1$ to $Y^3$, the phenyl groups may be connected by way of a single bond or by way of an alkylene radical, preferably including 1 to 10 carbon atoms. The alkylene radical can contain heteroatoms, especially O, S and N, pendantly or in the chain, and to be substituted by further groups, especially fluorine. The phenyl rings that carry the carbonyl group may also be connected to one another by way of fused phenyl rings, or cycloalkyl groups may be formed between the phenyl rings. The phenyl groups may also carry one or more further substituents, examples being halogen, alkyl groups, alkenyl groups, alkynyl groups, alkoxy groups, alkenoxy groups or ester groups. The groups $Y^1$ to $Y^3$ may each also comprise heteroaromatic radicals, especially 5- and 6-membered rings that may contain one or more heteroatoms, especially O, S, and N.

Preferably, $Y^1$ to $Y^3$ is selected is from the following group:

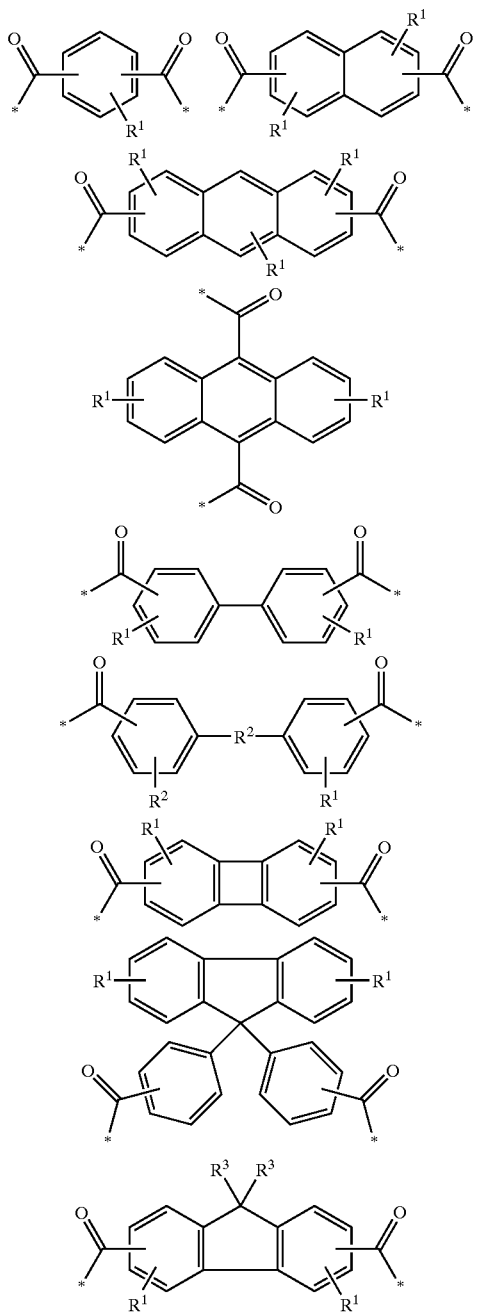

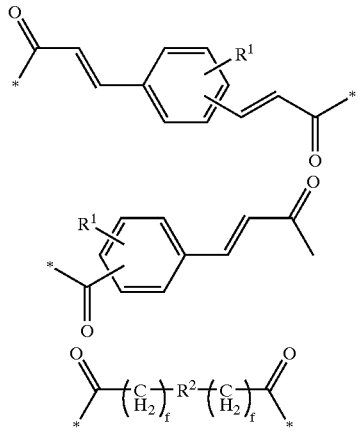

where
 f denotes an integer between 1 and 10 or, if $R^2$ is a single bond or *—$CH_2$—*, denotes an integer between and including 0 and 10;
 $R^1$, independently at each occurrence, denotes at least one radical selected from the group

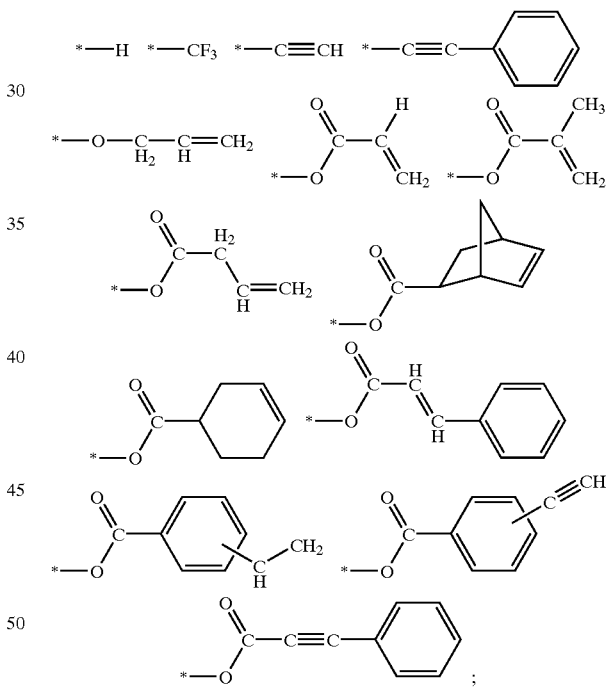

$R^2$ is as defined in claim 2; and
$R^3$ is selected from the group including the following:

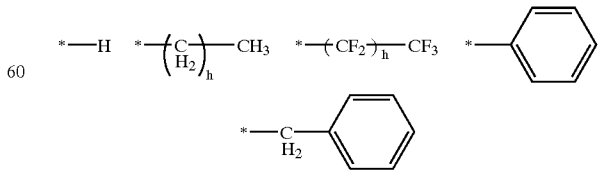

where h denotes an integer between and including 0 and 10.

The group X from Formula I permits polymerization of the polyhydroxyamides of the invention and/or copolymerization with further monomers and/or crosslinking of polymers that contain a reactive group. The group X must therefore include at least one reactive group that is able to form a bond to a further reaction center. The reactive group is preferably a polymerizable double or triple bond.

Where the side chain ends with a radical formed by a $Z^1$ to $Z^3$ group, X at its most simple is a hydrogen atom. In that case the side chain ends with an amino group, which is then able to produce a bond to a further polymer, by nucleophilic attack on the carbon atom of a carbonyl or carboxyl group. Preferably, X includes a polymerizable double or triple bond by which attachment to the double or triple bond of a further polymer can take place, by way for example of a free radical reaction. Preferred radicals for the group X are depicted below, with a=b=c=0 or d=0 and X selected from the following group:

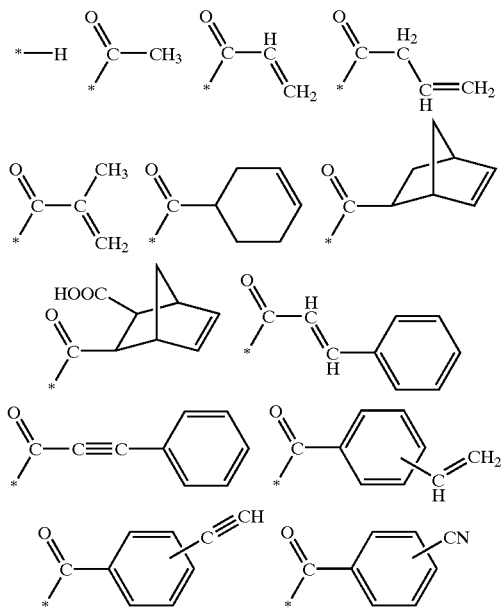

Where the side chain ends with a $Y^1$ to $Y^3$ group, X may for example be a hydroxyl group. In that case, the side chain ends with a carboxyl group, which by way of an amide bond, for example, is able to react with the amino group of a further polymer. The terminal group $Y^1$ to $Y^3$ may also be in ester form. In that case the group X is, for example, an alkoxy group or alkenoxy group. Corresponding cycloalkyl groups or aromatic groups are also possible. The group X may also be in the form of an amino group. In that case the $Y^1$ to $Y^3$ group possesses a terminal acid amide group, it being possible for the nitrogen atom thereof to be substituted by an alkyl radical, alkenyl radical, cycloalkyl radical, aryl radical, or aralkyl radical.

Preferred radicals for the group X are set out below, with a=1 and b=c=d=0 or d=1 and X selected from the following group:

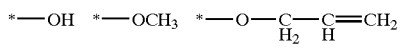

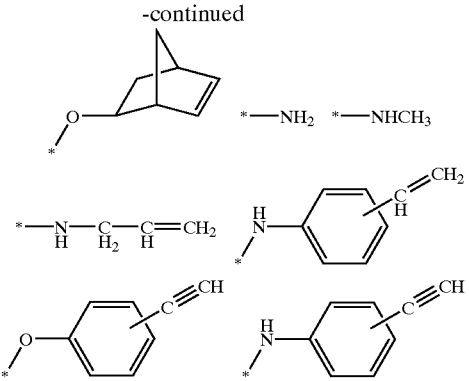

As already stated above, polymers having advantageous properties may be obtained from the polyhydroxyamides described above. The invention therefore also provides a temperature stable polymer obtained by polymerizing the polyhydroxyamide described above. The polymerisation takes place preferably with heating, with ring closure to the oxazole being possible simultaneously or in a separate temperature step.

The polyhydroxyamide from which the temperature stable polymer is obtained preferably includes a group X containing at least one polymerizable double or triple bond.

However, the polyhydroxyamides of the invention may also be used for crosslinking other polymers. The crosslinking produces a polymer having improved mechanical and chemical stability. The invention therefore additionally provides a three-dimensionally crosslinked polymer obtained by subjecting a monomer, oligomer, or polymer containing at least one reactive group which is able to react with the group X of one of the above-described polyhydroxyamides to form a chemical bond to reaction with one of the above-described polyhydroxyamides.

The group X in this case preferably includes a polymerizable double or triple bond and the reactive group that is able to react with the group X of the polyhydroxyamide to form a chemical bond preferably includes a polymerizable double or triple bond.

The invention is illustrated below by examples. First of all, various polyhydroxyamides are prepared, and are then reacted to give polymers. After that, the properties of the polymers are investigated further.

In the synthesis of the polyhydroxyamides, the following compounds are used as starting materials. The abbreviations of the compounds are also used subsequently.

Bisaminophenol 1

9,9'-Bis(4-((3-hydroxy-4-amino)phenyloxy)phenyl)fluorine

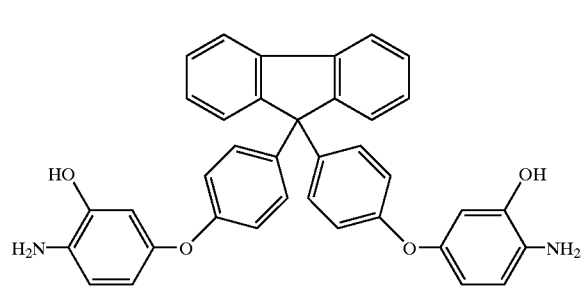

Bisaminophenol 2
2,2-Bis(3-amino-4-hydroxyphenyl)hexafluoropropane

Bisaminophenol 3
3,3'-Diamino-4,4'-dihydroxybiphenyl

Dicarbonyl Chloride 1
2,2-Bis(4-chlorocarbonylphenyl)hexafluoropropane

Endcap 1
Phenylpropiolyl chloride

Endcap 2
Methacryloyl chloride

Endcap 3
5-Norbornene-2-carbonyl chloride

Other features that are considered as characteristic for the invention are set forth in the appended claims.

Although the invention is described herein as embodied in a material and additive for highly crosslinked chemically and thermally stable polyhydroxyamide polymers, it is, nevertheless, not intended to be limited to the exemplary details since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments and examples.

DESCRIPTION OF THE PREFERRED EMBODIMENTS

EXAMPLE 1

Polyhydroxyamide 1

11.9 g (0.021 mol) of bisaminophenol 1 are dissolved in 750 ml of distilled N-methylpyrrolidone (NMP), and 16 ml (0.2 mol) of pyridine are added. The apparatus is gassed with argon as inert gas. All subsequent steps are likewise conducted under an inert atmosphere. The mixture is cooled to 5° C. 1.78 g (0.0067 mol) of 1,3,5-benzenetricarbonyl trichloride are dissolved in 400 ml of γ-butyrolactone and the solution is introduced slowly dropwise with stirring into the reaction solution. The reaction solution is stirred at 5° C. for 1 h and after warming to 20° C. is stirred for a further 12 h. The reaction solution is again cooled to 5° C. and 3.8 g (0.023 mol) of endcap 1 are added. The solution is stirred at 50° C. for 1 h and, after warming to 200° C., for a further 12 h.

The polymer is isolated by dynamic precipitation in ice water. First 3 l of ice water are introduced and the reaction solution is introduced dropwise. Gradually, a further 6 l of ice water are added until precipitation is at an end. The white precipitate is filtered with suction and washed in 3 l of deionised water, then in 3 l of a 0.25% strength solution of ammonium hydroxide, and again in 3 l of deionised water. The product is dried at 50° C./100 mbar for 72 h.

The yield is 14.86 g.

The polyhydroxyamide prepared in this way is readily soluble in solvents such as NMP, γ-butyrolactone, tetrahydrofuran, cyclohexanone, cyclopentanone, and diethylene glycol monomethyl ether.

EXAMPLE 2

Polyhydroxyamide 2

30 g (0.082 mol) of bisaminophenol 2 are dissolved in 1500 ml of distilled N-methylpyrrolidone (NMP), and 25 ml (0.33 mol) of pyridine are added. The apparatus is gassed with argon as inert gas. All subsequent steps are likewise conducted under an inert atmosphere. The mixture is cooled to 5° C. 6.6 g (0.025 mol) of 1,3,5-benzenetricarbonyl trichloride are dissolved in 400 ml of γ-butyrolactone and the solution is introduced slowly dropwise with stirring into the reaction solution. The reaction solution is stirred at 5° C. for 1 h and after warming to 20° C. is stirred for a further 12 h. The reaction solution is again cooled to 5° C. and 9 ml (0.093 mol) of endcap 2 are added. The solution is stirred at 5° C. for 1 h and, after warming to 20° C., for a further 12 h.

The polymer is isolated by dynamic precipitation in ice water. First 4 l of ice water are introduced and the reaction solution is introduced dropwise. Gradually, a further 8 l of ice water are added until precipitation is at an end. The white precipitate is filtered off with suction and washed in 3 l of deionised water, then in 4 l of a 0.25% strength solution of ammonium hydroxide, and again in 4 l of deionised water. The product is dried at 50° C./100 mbar for 72 h.

The yield is 40.5 g.

The polyhydroxyamide prepared in this way is readily soluble in solvents such as NMP, γ-butyrolactone, tetrahydrofuran, cyclohexanone, cyclopentanone, and diethylene glycol monomethyl ether.

EXAMPLE 3

Polyhydroxyamide 3

10.1 g (0.047 mol) of bisaminophenol 3 are dissolved in 750 ml of NMP, 4 ml (0.05 mol) of pyridine are added, and the mixture is cooled to 5° C. All steps are conducted under an inert atmosphere. 10 g (0.023 mol) of dicarbonyl chloride 1 dissolved in 150 ml of γ-butyrolactone and the solution is added dropwise with stirring. The reaction solution is stirred at 5° C. for 1 h and at 20° C. for 12 h. It is then again cooled to 5° C. and 4 ml (0.05 mol) of pyridine are added and 2.04 g (0.0077 mol) of 1,3,5-benzenetricarbonyl chloride in solution in 30 ml of γ-butyrolactone are added dropwise. The reaction solution is stirred at 5° C. for 1 h and at 20° C. for 12 h. The reaction solution is again cooled to 5° C., 4 ml (0.05 mol) of pyridine are added 3.6 g (0.023 mol) of endcap 3 as a solution in 30 ml of γ-butyrolactone are added dropwise. Stirring is continued at 5° C. for 1 h and at 20° C. for 12 h.

The polymer is isolated by dynamic precipitation in ice water. First 3 l of ice water are introduced and the reaction solution is introduced dropwise. Gradually, a further 6 l of ice water are added until precipitation is at an end. The white precipitate is filtered with suction and washed in 3 l of deionised water, then in 3 l of a 0.25% strength solution of ammonium hydroxide, and again in 3 l of deionised water. The product is dried at 50° C./100 mbar for 72 h.

The yield is 21.4 g.

The polyhydroxyamide prepared in this way is readily soluble in solvents such as NMP, γ-butyrolactone, tetrahydrofuran, cyclohexanone, cyclopentanone, and diethylene glycol monomethyl ether.

EXAMPLE 4 a) Preparation of Polymer Solutions 5 g of the polyhydroxyamides prepared as in Examples 1 to 3 are dissolved in 20 g of NMP, such as that sold under the trademark VLSI-SELECTIPUR®. The dissolution operation takes place appropriately on a shaker apparatus. The solution is subsequently filtered under pressure through a 0.2 μm filter into a cleaned, particle-free, glass sample vessel.

b) Use of Polyhydroxyamide 2 as an Additive in Polymers Containing Endcaps Having Double Bonds 2 g of the polyhydroxyamide 2 prepared in Example 2 are dissolved in 20 g of NMP, such as that sold under the trademark VLSI-SELECTIPUR®, together with 10 g of polyhydroxyamide prepared in analogy to Ex. 1 from U.S. Pat. No. 5,077,378. The dissolution operation occurs appropriately on a shaker apparatus. The solution is subsequently filtered under pressure through a 0.2 μm filter into a cleaned, particle-free, glass sample vessel.

EXAMPLE 5

Cyclization of the Polyhydroxyamides on Silicon Wafers and Determination of the Thermal Stabilities The polymer solutions prepared in Example 4 are applied by spin coating methods (2500 rpm, 20 s) to a silicon wafer and dried at 120° C. for 60 s and at 200° C. for 2 min. The coated wafer is then heat treated in a diffusion oven under nitrogen (heating program: 1 h to 400° C. at 3 K/min).

The polyhydroxyamide films prepared exhibit thermal stabilities of >510° C. according to TGA (instrument: STA 1500 from Rheometric Scientific, heating rate: 5 K/min, inert gas: argon). The isothermal mass loss per hour at 425° C. for 10 hours is:

| Ex. 1: | 0.1% |
| --- | --- |
| Ex. 2: | 0.2% |
| Ex. 3: | 0.1% |
| Ex. 4: | 0.2% (with polyhydroxyamide 2 as additive) |
|  | 3.2% (without polyhydroxyamide 2 as additive) |

EXAMPLE 6

Preparation of a Polymer Solution from Polyhydroxyamide 1 and Investigation of the Properties 5 g of polyhydroxyamide 1 prepared in Example 1 are dissolved in 20 g of NMP, such as those sold under the trademark VLSI-SELECTIPUR®. The dissolution operation takes place appropriately on a shaker apparatus. The solution is then filtered under pressure through a 0.2 μm filter into a cleaned, particle-free, glass sample vessel.

a) Determination of the Adhesion of Polyhydroxyamide 1 on a Titanium Nitride Layer A 4" silicon wafer is sputter coated with a titanium nitride layer 50 nm thick. The abovementioned solution is applied to this wafer by spin coating, 5 s at 500 rpm and 25 s at 3500 rpm. Following a brief softbake of 1 min at 120° C. on a hotplate, 10 silicon chips measuring 4×4 mm$^2$, likewise sputter coated on the surface with 20 nm of titanium nitride, are pressed onto the polyhydroxyamide 1 film with a force of 2 N. This stack is then heat treated in an oven at 300° C. in a nitrogen atmosphere for 1 h. After cooling to room temperature, an adhesion test is conducted with a shear tester, in particular, one sold under the trademark Dage series 400. The average force needed to shear off the Si chips is 1.9 kg/mm$^2$ (18.64 N/mm$^2$).

b) Determination of the Adhesion of Polyhydroxyamide 1 to a Tantalum Nitride Layer The adhesion is determined as described in Ex. 6a except that in this case the surface of the wafer and of the chips consists not of titanium nitride but instead of tantalum nitride. The average force required to shear off the Si chips is 1.9 kg/mm$^2$ (18.64 N/mm$^2$).

c) Determination of the Adhesion of Polyhydroxyamide 1 to a Silicon Slice

The adhesion is determined as described in Ex. 6a except that in this case the surface of the wafer and of the chips consists not of titanium nitride but instead of silicon. The average force required to shear off the Si chips is 2.0 kg/mm$^2$ (19.62 N/mm$^2$).

d) Determination of the Adhesion of Polyhydroxyamide 1 Following Thermal Exposure Tests The same specimens were produced as in Ex. 6a to 6c. After baking at 300° C., this stack is thermally exposed 50 times between −50° C. and 150° C. in a controlled-climate cabinet, such as those sold under the trademark Vötsch VT7004. Following this treatment a shear test is conducted. In this case, the forces are as follows:

| Ex. 6a: | 1.8 kg/mm$^2$ (17.66 N/mm$^2$) |
| --- | --- |
| Ex. 6b: | 1.7 kg/mm$^2$ (16.68 N/mm$^2$) |
| Ex. 6c: | 1.9 kg/mm$^2$ (18.64 N/mm$^2$) |

EXAMPLE 7

Preparation of a Polymer Solution of Polyhydroxyamide 2 and Investigation of the Properties 5 g of polyhydroxyamide 2 prepared in Example 2 are dissolved in 20 g of NMP, such as that sold under the trademark VLSI-SELECTIPUR®. The dissolution operation takes place appropriately on a shaker apparatus. The solution is then filtered under pressure through a 0.2 μm filter into a cleaned, particle-free, glass sample vessel.

a) Determination of the Adhesion of Polyhydroxyamide 2 on a Titanium Nitride Layer A 4" silicon wafer is sputter coated with a titanium nitride layer 50 nm thick. The abovementioned solution is applied to this wafer by spin coating, 5 s at 500 rpm and 25 s at 3500 rpm. Following a brief softbake of 1 min at 120° C. on a hotplate, 10 silicon chips measuring 4×4 cm$^2$, likewise sputter coated on the surface with 50 nm of titanium nitride, are pressed onto the polyhydroxyamide 2 film with a force of 2 N. This stack is then heat treated in an oven at 300° C. in a nitrogen atmosphere for 1 h. After cooling to room temperature, an adhesion test is conducted with a shear tester such as those sold under the trademark Dage series 400. The average force needed to shear off the Si chips is 2.0 kg/mm$^2$ (19.62 N/mm$^2$).

b) Determination of the Adhesion of Polyhydroxyamide 2 to a Tantalum Nitride Layer The adhesion is determined as described in Ex. 7a except that in this case the surface of the wafer and of the chips consists not of titanium nitride but instead of tantalum nitride. The average force required to shear off the Si chips is 1.9 kg/mm$^2$ (18.64 N/mm$^2$).

c) Determination of the Adhesion of Polyhydroxyamide 2 to a Silicon Slice

The adhesion is determined as described in Ex. 7a except that in this case the surface of the wafer and of the chips consists not of titanium nitride but instead of silicon. The average force required to shear off the Si chips is 2.0 kg/mm$^2$ (19.62 N/mm$^2$).

d) Determination of the Adhesion of Polyhydroxyamide 2 Following Thermal Exposure Tests The same specimens were produced as in Ex. 7a to 7c. After baking at 300° C., this stack is thermally exposed 50 times between −50° C. and 150° C. in a controlled-climate cabinet such as those sold under the trademark Vötsch VT7004. Following this treatment, a shear test is conducted. In this case, the forces are as follows:

| Ex. 7a: | 1.7 kg/mm$^2$ (16.68 N/mm$^2$) |
| Ex. 7b: | 1.9 kg/mm$^2$ (18.64 N/mm$^2$) |
| Ex. 7c: | 2.0 kg/mm$^2$ (19.62 N/mm$^2$) |

EXAMPLE 8

Preparation of a Polymer Solution from Polyhydroxyamide 3 and Investigation of the Properties 5 g of polyhydroxyamide 3 prepared in Example 3 are dissolved in 20 g of NMP, such as that sold under the trademark VLSI-SELECTIPUR®). The dissolution operation occurs appropriately on a shaker apparatus. The solution is then filtered under pressure through a 0.2 μm filter into a cleaned, particle-free, glass sample vessel.

a) Determination of the Adhesion of Polyhydroxyamide 3 on a Titanium Nitride Layer A 4" silicon wafer is sputter coated with a titanium nitride layer 50 nm thick. The abovementioned solution is applied to this wafer by spin coating, 5 s at 500 rpm and 25 s at 3500 rpm. Following a brief softbake of 1 min at 120° C. on a hotplate, 10 silicon chips measuring 4×4 mm$^2$, likewise sputter coated on the surface with 50 nm of titanium nitride, are pressed onto the polyhydroxyamide 3 film with a force of 2 N. This stack is then heat treated in an oven at 300° C. in a nitrogen atmosphere for 1 h. After cooling to room temperature, an adhesion test is conducted with a shear tester, such as those sold under the trademark Dage series 400. The average force needed to shear off the Si chips is 1.9 kg/mm$^2$ (18.64 N/mm$^2$).

b) Determination of the Adhesion of Polyhydroxyamide 3 to a Tantalum Nitride Layer The adhesion is determined as described in Ex. 8a except that in this case the surface of the wafer and of the chips consists not of titanium nitride but instead of tantalum nitride. The average force required to shear off the Si chips is 2.0 kg/mm$^2$ (19.62 N/mm$^2$).

c) Determination of the Adhesion of Polyhydroxyamide 3 to a Silicon Slice

The adhesion is determined as described in Ex. 8a except that in this case the surface of the wafer and of the chips consists not of titanium nitride but instead of silicon. The average force required to shear off the Si chips is 2.1 kg/mm$^2$ (20.60 N/mm$^2$).

d) Determination of the Adhesion of Polyhydroxyamide 3 Following Thermal Exposure Tests The same specimens were produced as in Ex. 8a to 8c. After baking at 300° C., this stack is thermally exposed 50 times between −50° C. and 150° C. in a controlled-climate cabinet, such as those available under the trademark Vötsch VT7004.

Following this treatment, a shear test is conducted. In this case, the forces are as follows:

| Ex. 8a: | 1.8 kg/mm$^2$ (17.66 N/mm$^2$) |
| Ex. 8b: | 1.9 kg/mm$^2$ (18.64 N/mm$^2$) |
| Ex. 8c: | 2.0 kg/mm$^2$ (19.62 N/mm$^2$) |

EXAMPLE 9

Determination of the Adhesion of Polymer Solutions Prepared According to Example 4b a) Determination of the Adhesion on a Titanium Nitride Layer A 4" silicon wafer is sputter coated with a titanium nitride layer 50 nm thick. The abovementioned solution is applied to this wafer by spin coating, 5 s at 500 rpm and 25 s at 3500 rpm. Following a brief softbake of 1 min at 120° C. on a hotplate, 10 silicon chips measuring 4×4 mm$^2$, likewise sputter coated on the surface with 50 nm of titanium nitride, are pressed onto the polyhydroxyamide film with a force of 2 N. This stack is then heat treated in an oven at 300° C. in a nitrogen atmosphere for 1 h. After cooling to room temperature, an adhesion test is conducted with a shear tester, such as those sold under the trademark Dage series 400. The average force needed to shear off the Si chips is 1.9 kg/mm$^2$ (18.64 N/mm$^2$).

b) Determination of the Adhesion to a Tantalum Nitride Layer

The adhesion is determined as described in Ex. 9a except that in this case the surface of the wafer and of the chips consists not of titanium nitride but instead of tantalum nitride. The average force required to shear off the Si chips is 1.9 kg/mm$^2$ (18.64 N/mm$^2$)

c) Determination of the Adhesion to a Silicon Slice

The adhesion is determined as described in Ex. 9a except that in this case the surface of the wafer and of the chips consists not of titanium nitride but instead of silicon. The average force required to shear off the Si chips is 2.0 kg/mm$^2$ (19.62 N/mm$^2$).

d) Determination of the Adhesion Following Thermal Exposure Tests

The same specimens were produced as in Ex. 9a to 9c. After baking at 300° C., this stack is thermally exposed 50 times between −50° C. and 150° C. in a controlled-climate cabinet, such as those sold under the trademark Vötsch VT7004. Following this treatment, a shear test is conducted. In this case, the forces are as follows:

| | |
|---|---|
| Ex. 9a: | 1.8 kg/mm$^2$ (17.66 N/mm$^2$) |
| Ex. 9b: | 1.9 kg/mm$^2$ (18.64 N/mm$^2$) |
| Ex. 9c: | 2.9 kg/mm$^2$ (18.64 N/mm$^2$) |

EXAMPLE 10

Comparative Example, Adhesion

A polyhydroxyamide is synthesized in analogy to Ex. 1 of U.S. Pat. No. 5,077,378 and a solution in NMP is prepared as described in Example 6. Thereafter the shear force is determined using the same experiments as described in Examples 6a to 6c. The following averages are measured:

| | |
|---|---|
| Titanium nitride surface: | 1.5 kg/mm$^2$ (14.71 N/mm$^2$) |
| Tantalum nitride surface: | 1.6 kg/mm$^2$ (15.69 N/mm$^2$) |
| Silicon surface: | 1.55 kg/mm$^2$ (15.21 N/mm$^2$) |

EXAMPLE 11

Determination of the Chemical Stability

A 4" silicon wafer is spin coated with polyhydroxyamide from 20% strength solution (solvent: NMP), 5 s at 500 rpm and 25 s at 3500 rpm. After a brief softbake of 1 min at 120° C. on a hotplate, the wafer is heat treated in an oven at 300° C. for 1 h in a nitrogen atmosphere. After cooling to room temperature, the coated wafer is heated at 80° C. in NMP for 5 h. Thereafter, the wafer is vacuum dried at 200° C. for 60 min and the mass difference is measured. The mass decrease is as follow:

| | |
|---|---|
| Ex. 1: | 0.6% |
| Ex. 2: | 0.8% |
| Ex. 3: | 0.5% |
| Ex. 4: | 0.7% (with polyhydroxyamide 2 as additive) |
| | 7.4% (without polyhydroxyamide 2 as additive). |

We claim:

1. A polyhydroxyamide having the formula

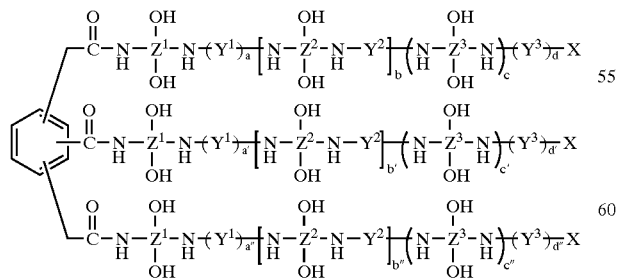

where a, a', a" to d, d', d" may each be identical or different and
a=0 or 1;
b=0 to 100;
c=0 or 1; and
d=0 or 1;

where if a=0, b=c=0;
if c=0, d=0; and
if a=1 and b=c=0, d=0; and where $Z^1$, $Z^2$, and $Z^3$ may each be identical or different and denote a tetravalent radical having up to 100 carbon atoms;

$Y^1$, $Y^2$, and $Y^3$ may be identical or different and denote a divalent radical including at least two carbonyl groups forming an amide bond to an adjacent nitrogen, and including up to 100 carbon atoms; and X is selected from the group consisting of hydrogen and a monovalent radical having up to 30 carbon atoms including a reactive group for forming a bond to another reaction center.

2. The polyhydroxyamide according to claim 1, wherein $Z^1$, $Z^2$, and $Z^3$, each independently of one another, are selected from the group consisting of

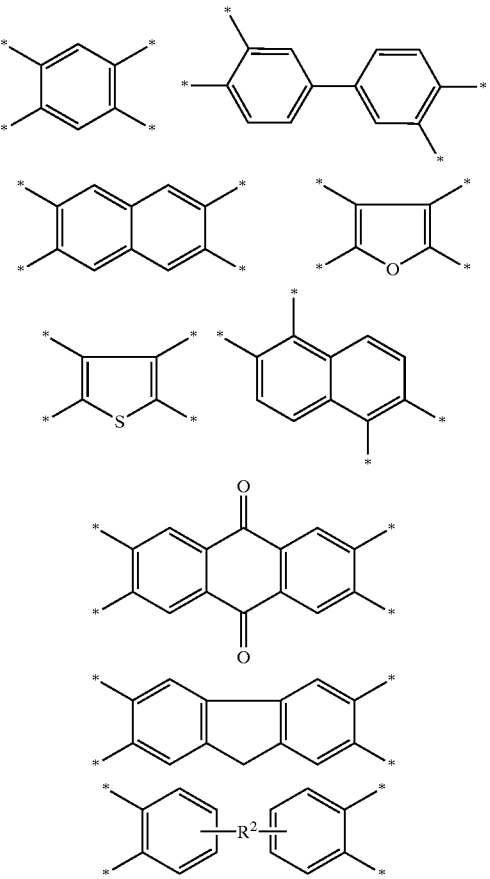

-continued

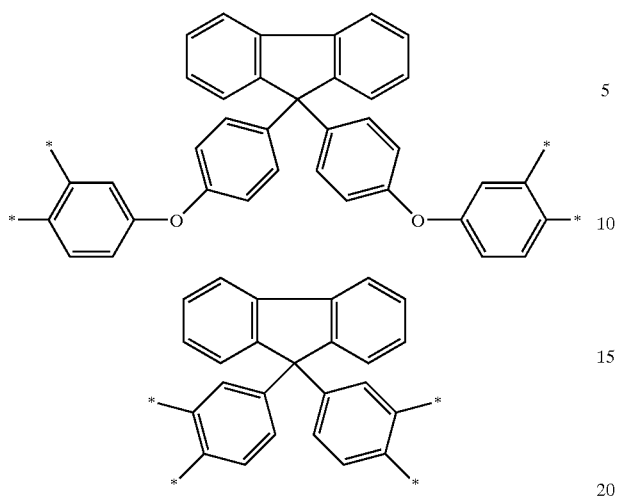

where R² is a divalent radical selected from the group consisting of

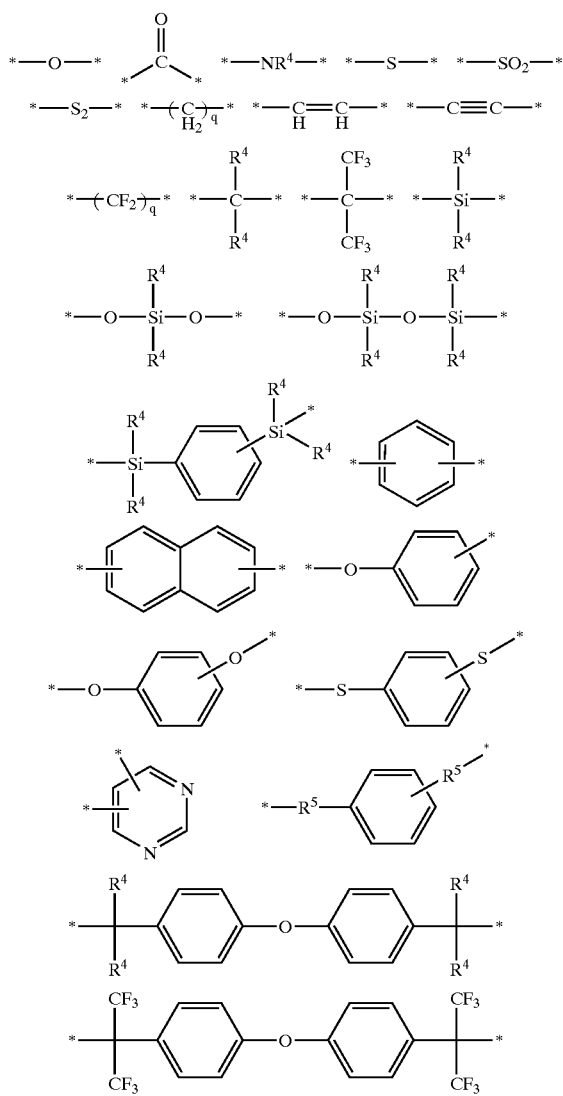

-continued

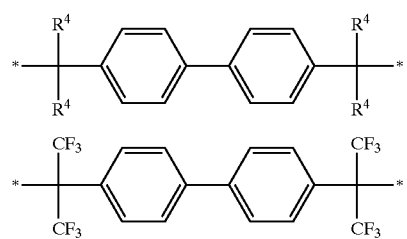

where g denotes an integer between and including 1 and 10;

R⁴ is selected from the group consisting of an alkyl group having 1 to 10 carbons, an aryl group having 6 to 20 carbons, and an aralkyl group having 7 to 30 carbons; and R⁵ is selected from the group consisting of an alkylene group having 1 to 10 carbons, an arylene group having 6 to 20 carbons, and an aralkylene group having 7 to 30 carbons.

3. The polyhydroxyamide according to claim 1, wherein $Y^1$, $Y^2$, and $Y^3$ each independently of one another are selected from the group consisting of:

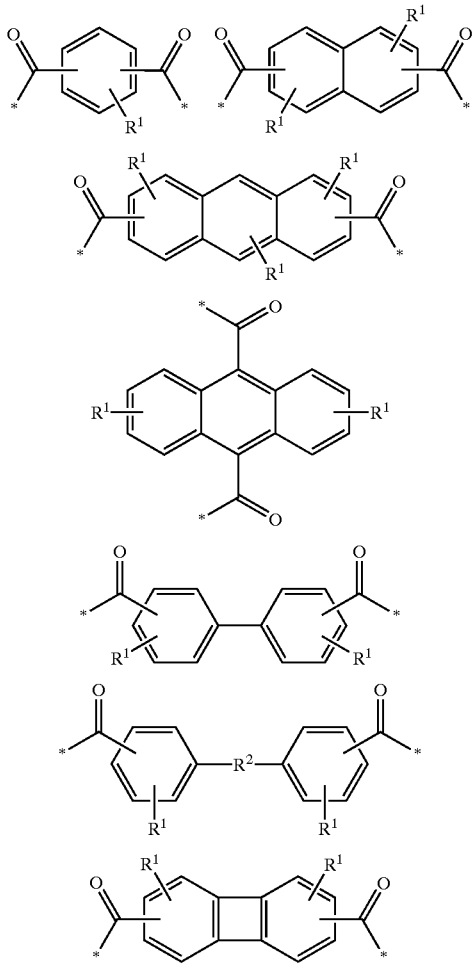

-continued
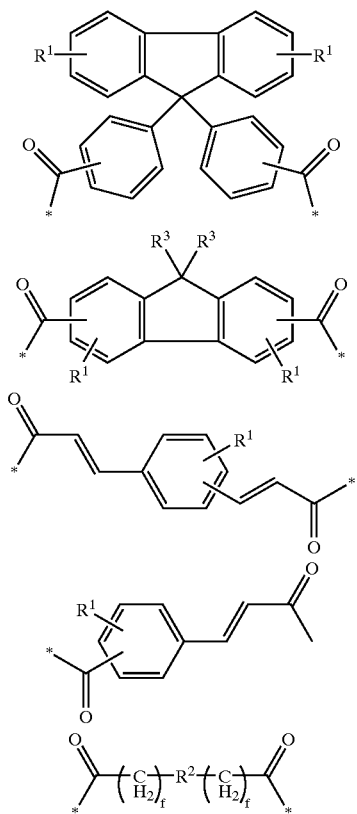
where
f denotes an integer between and including 1 and 10 when $R^2$ is not a single bond or *—CH$_2$—*, and an integer between and including 0 and 10 when $R^2$ is a single bond or *—CH$_2$—*;
$R^1$, independently at each occurrence, denotes at least one radical selected from the group consisting of
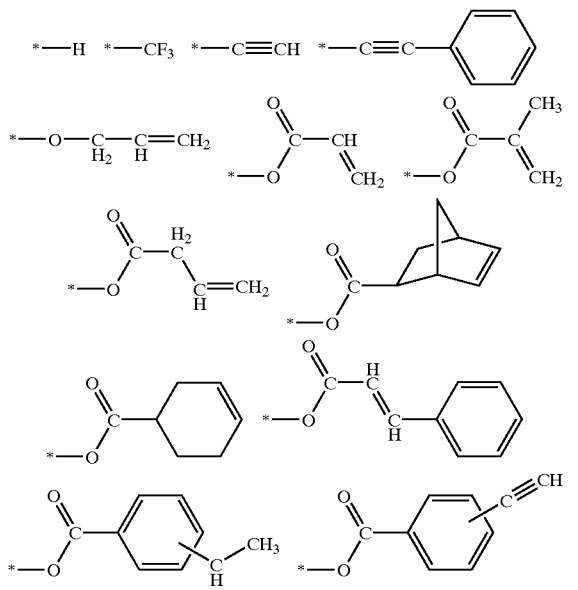
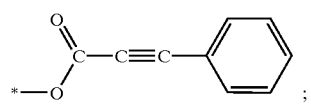
where $R^2$ is a divalent radical selected from the group consisting of
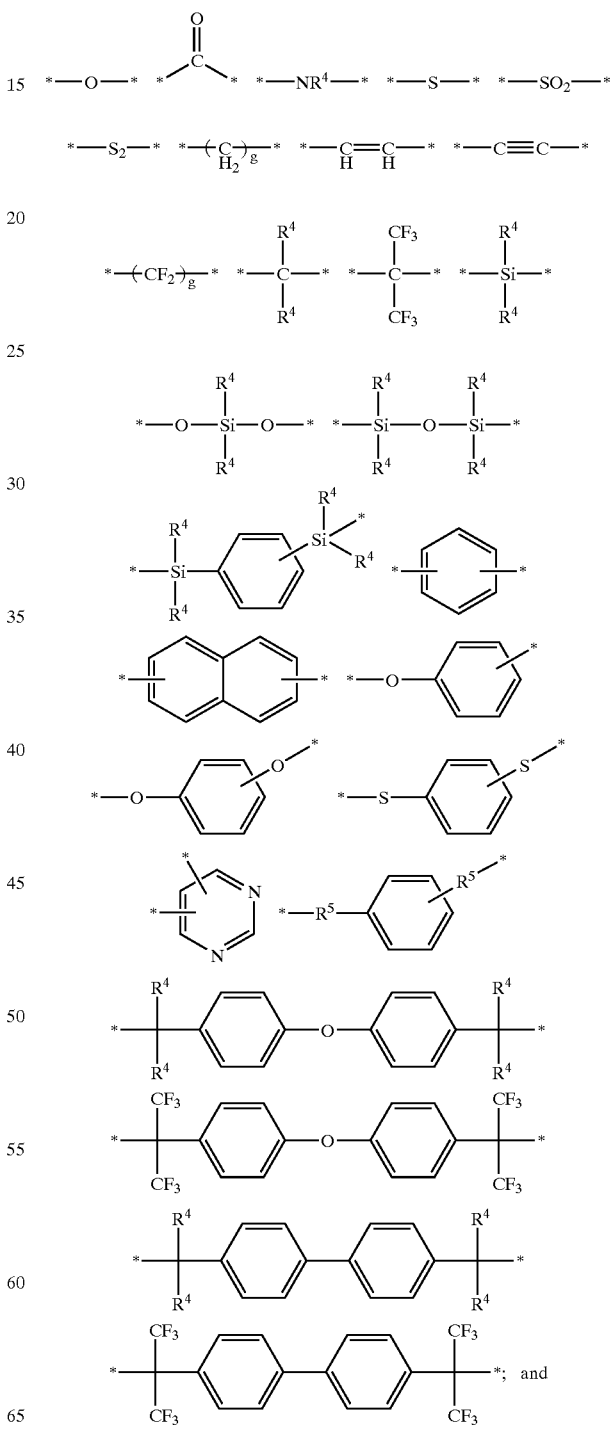

$R^3$ is selected from the group consisting of

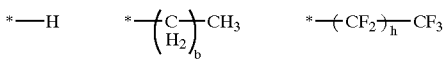
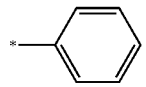
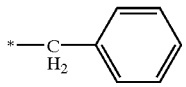

where h denotes an integer between and including 0 and 10.

4. The polyhydroxyamide according to claim 1, wherein a=b=c=d=0 or d=0 and X is selected from the group consisting of:

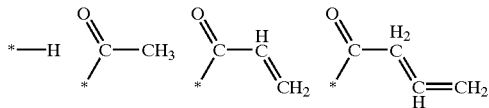
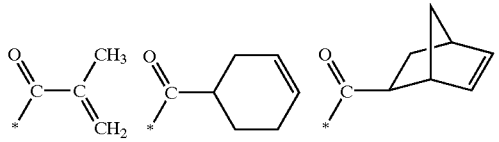
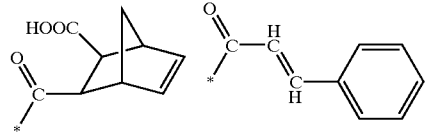
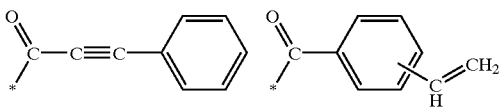
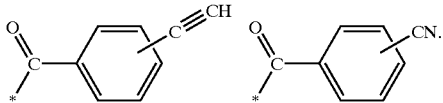

5. The polyhydroxyamide according to claim 1, wherein a=1 and b=c=d=0 or d=1 and X is selected from the group consisting of:

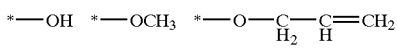
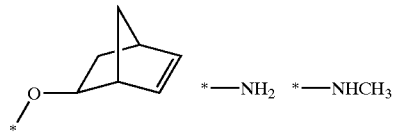
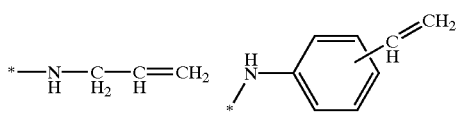

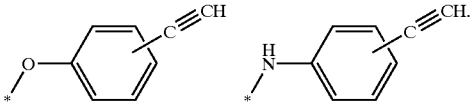

6. A temperature stable polymer made by a process, which comprises polymerising a polyhydroxyamide having the formula

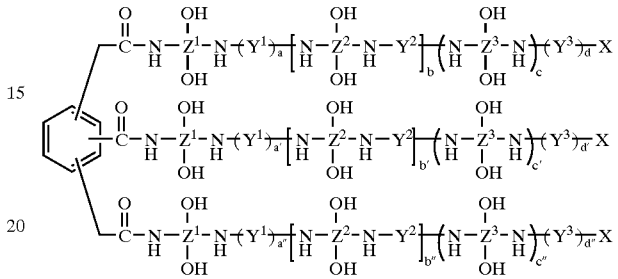

where a, a', a" to d, d', d", may each be identical or different and a=0 or 1;

b=0 to 100;

c=0 or 1; and d=0 or 1;

where if a=0, b=c=0;

if c=0, d=0; and if a=1 and b=c=0, d=0; and where $Z^1$, $Z^2$, and $Z^3$ may each be identical or different and denote a tetravalent radical having up to 100 carbon atoms;

$Y^1$, $Y^2$, and $Y^3$ may be identical or different and denote a divalent radical including at least two carbonyl groups forming an amide bond to an adjacent nitrogen, and including up to 100 carbon atoms; and X is selected from the group consisting of hydrogen and a monovalent radical having up to 30 carbon atoms including a reactive group for forming a bond to another reaction center.

7. The temperature stable polymer according to claim 6, wherein the group X of the polyhydroxyamide includes a polymerizable multiple bond.

8. The temperature stable polymer according to claim 7, wherein said multiple bond is a double bond.

9. The temperature stable polymer according to claim 7, wherein said multiple bond is a triple bond.

10. A three-dimensionally crosslinked polymer, comprising:

a polyhydroxyamide having a Formula I

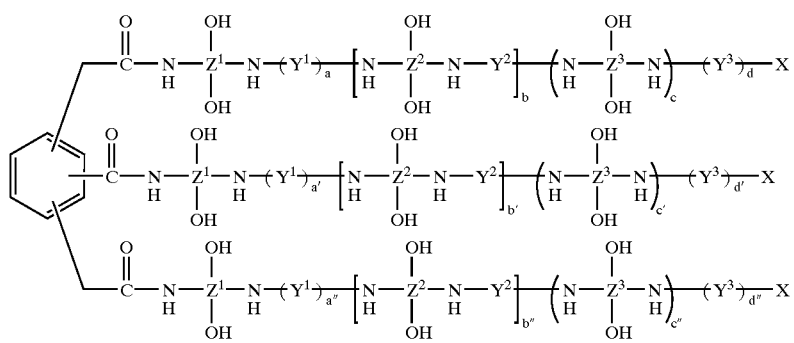

Formula I where
- a, a', a" to d, d', d" may each be identical or different and
- a=0 or 1;
- b=0 to 100;
- c=0 or 1; and
- d=0 or 1;

where
- if a=0, b=c=0;
- if c=0, d=0; and
- if a=1 and b=c=0, d=0;

where
- $Z^1$, $Z^2$, and $Z^3$ may each be identical or different and denote a tetravalent radical having up to 100 carbon atoms;
- $Y^1$, $Y^2$, and $Y^3$ may be identical or different and denote a divalent radical including at least two carbonyl groups forming an amide bond to an adjacent nitrogen, and including up to 100 carbon atoms; and
- X is selected from the group consisting of hydrogen and a monovalent radical having up to 30 carbon atoms including a reactive group for forming a bond to another reaction center; and
- a reactant selected from the group consisting of a monomer, oligomer, and polymer; said reactant including a reactive group reacted with the group X of said polyhydroxyamide.

11. The three-dimensionally crosslinked polymer according to claim 10, wherein:
   said group X includes a polymerizable multiple bond; and
   said reactive group is a polymerizable multiple bond.

12. The three-dimensionally crosslinked polymer according to claim 11, wherein said polymerizable multiple bond of said group x is selected from the group consisting of a double bond and a triple bond.

13. The three-dimensionally crosslinked polymer according to claim 11, wherein said polymerizable multiple bond of said reactive group is selected from the group consisting of a double bond and a triple bond.

* * * * *